(12) United States Patent
Uradnisheck et al.

(10) Patent No.: US 7,786,210 B2
(45) Date of Patent: Aug. 31, 2010

(54) PLASTICIZED POLY(HYDROXYALKANOIC ACID) COMPOSITION

(75) Inventors: Julius Uradnisheck, Glen Mills, PA (US); Edmund Arthur Flexman, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 19 days.

(21) Appl. No.: 12/270,632

(22) Filed: Nov. 13, 2008

(65) Prior Publication Data

US 2009/0131566 A1 May 21, 2009

Related U.S. Application Data

(60) Provisional application No. 61/003,158, filed on Nov. 15, 2007.

(51) Int. Cl.
*C08L 67/04* (2006.01)
(52) U.S. Cl. .................. 524/599; 524/296; 524/298; 524/315; 524/317; 524/377
(58) Field of Classification Search .................. 524/599
See application file for complete search history.

(56) References Cited

U.S. PATENT DOCUMENTS

| | | | |
|---|---|---|---|
| 5,443,780 A | 8/1995 | Matsumoto | |
| 6,114,495 A | 9/2000 | Kolstad | |
| 6,323,308 B1 | 11/2001 | Kobayashi | |
| 6,417,294 B1 | 7/2002 | Obuchi | |
| 6,803,443 B1 | 10/2004 | Ariga et al. | |
| 6,943,214 B2 | 9/2005 | Flexman | |
| 6,960,374 B1 | 11/2005 | Terada | |
| 7,175,917 B2 | 2/2007 | Sukigara | |
| 2004/0242803 A1 | 12/2004 | Ohme | |
| 2009/0311511 A1* | 12/2009 | Obuchi et al. ............... 428/323 | |

FOREIGN PATENT DOCUMENTS

| | | |
|---|---|---|
| EP | 1746136 A1 | 1/2007 |
| EP | 1785453 A1 | 5/2007 |
| JP | 07188537 | 7/1995 |
| JP | H06-160314 A1 | 1/1996 |
| JP | H09-316310 A1 | 9/1997 |
| JP | H09-286909 A1 | 11/1997 |
| JP | H11-240962 A1 | 9/1999 |
| JP | 2002-146170 A1 | 5/2002 |
| JP | 2003286396 | 10/2003 |
| JP | 2007-145937 A1 | 6/2007 |
| WO | 94/04607 | 3/1994 |
| WO | 0023520 A | 4/2000 |
| WO | 03014224 A2 | 2/2003 |
| WO | 03082980 A1 | 10/2003 |
| WO | 2004101642 A1 | 11/2004 |
| WO | 2005/059031 A | 6/2005 |

OTHER PUBLICATIONS

Zhang; Physical Characterization of coupled Poly(lactic acid)/Starch/Maleic acid Anhydride Blends Plasticized by Acetyl Triethyl Citrate; Macromolecular Bioscience, 2004, 4, 1053-1060.
Ren; Dynamic Mechanical and Thermal Properties of Plasticized Poly(lactic acid); Journal of Applied Polymer Science, vol. 101, 1583-1590.
Labrecque; Citrate Easter as Plasticizer for Poly(lactic acid); Journal of Applied Polymer Science, vol. 66, 1507-1513.
Kranz; Physicomechanical Properties of Biodegradable Poly (D,L-Lactide) and Poly (D,L-Lactide-co-glycolide); Journal of Pharmaceutical Science, vol. 89, Dec. 2000.
Jacobson; Plasticizing Polylactide-The Effect of Different Plasticizers on the Mechnical Properties; Polymer Engineering and Science, vol. 39, Jul. 1999.
Martin; Poly(lactic acid): plasticization and properties of biodegradable multiphase systems; Polymer 42 (2001) 6209-621.
Ljungberg: Film Extrsusion and Film Weldability of Poly(lactic acid) Plasticized with Triacetine and Tributyl Citrate; Journal of Applied Polymer Science, vol. 88, 3239-3247 (2003).
Ljungberg: Preparation and Properties of Plasticized Poly(lactic acid) Films; Biomacromolecules 2005, 6, 1789-1796.

* cited by examiner

*Primary Examiner*—Peter Szekely

(57) ABSTRACT

Disclosed is a composition comprising poly(hydroxyalkanoic acid), plasticizer, and optionally a nucleator, an impact modifier, or both. Also disclosed is a process for producing a thermoformed two-dimensional article having a surface area to thickness ratio greater than about 200:1 inch.

20 Claims, No Drawings

PLASTICIZED POLY(HYDROXYALKANOIC ACID) COMPOSITION

This application claims priority to provisional application Ser. No. 61/003,158, filed Nov. 15, 2007; the entire disclosure of which is incorporated herein by reference.

The invention relates to a composition comprising poly(hydroxyalkanoic acid), a plasticizer, and a nucleator and to an article comprising or produced from the composition.

BACKGROUND OF THE INVENTION

Poly(hydroxyalkanoic acid) (PHA) such as polylactic acid (PLA) is a resin comprising renewable monomer such as production by bacterial fermentation processes or isolated from plant matter that include corn, sugar beets, or sweet potatoes. The resin can be used for thermoformed packaging articles such as cups, trays, and clam shells. Generally, the resin is first extruded into an amorphous sheet and formed above is glass transition temperature ($T_g$) into finished articles.

Unoriented sections of the articles do not fully crystallize because many PLA grades crystallizes too slowly in high speed thermoforming equipment or crystallize with less than 10% crystallinity. As PLA grades popular for thermoforming have a $T_g$ of about 55° C., articles of such PLA that are thermoformed into cool molds have poor dimensional stabilities when heated above the $T_g$. A thermoformed or stretched article may shrink in a few seconds more than 5% (sometimes 50%) when heated above the $T_g$. The tendency for shrinkage is especially high (to 50%) in those parts of a molded article that experience a critical amount of orientation less than about 50% (final length or area is 50% greater than the pre-formed length or area) but more than about 10%. Those regions having higher than about 50% orientation may experience some strain-induced crystallization and thereby have shrinkages as low as 10% at temperatures slightly above $T_g$. Those areas having no orientation may have low shrinkages (<10%); however, these areas are soft and easily deform at temperatures slightly above $T_g$. Those regions in between 50% and 10% have the highest shrinkage which is the subject of this application. High forces can be generated by shrinkage and therefore the shrinkage of one region in a complex hollow article can be magnified into a larger dimensional effect on overall structure. Therefore for the purpose of this application the desirable shrinkage is less than 10%, less than 5%, or less than 1%.

The shrinkage force is due to the presence of amorphous orientation which is PHA containing stretched PHA molecules not crystallized and amorphous but immobilized in place by the rapid cooling in the molded article to below its Tg. When the temperature rises above $T_g$ these stretched amorphous molecules relax rapidly and induce or cause shrinkage if the article is not constrained from shrinking. Some additional shrinkage in a few minutes can arise from crystallization if the PHA is a particularly fast crystallizing PHA. For example of a fast crystallizing PHA is PLA having molecular weight below about 10,000 Dalton, low D-lactide (meso-lactide) content, and/or use of high amounts of special nucleators and/or if the temperature rises to halfway between $T_g$ and the melt point.

To solve the problems, one may increase crystallinity or decrease amorphous orientation or use a combination.

For example, to increase the crystallinity, one may heat-treat the molded article at a temperature half way between the glass transition and the crystalline melt point. For typical PLA that would be 110° C. for several seconds to avoid the shrinkage when heated above 55° C. Doing so will cause the article to shrink in the first few seconds of the heat treatment. To compensate for shrinkage, the thermoforming mold would have to be designed with a larger size so that the shrinkage of the article is counter balanced. Such a mold design is complicated and nevertheless given inconsistent results due to small variations of the molding process and sheet causing larger effects on shrinkage.

One may heat-treat the article for several minutes at about 110° C. while it is constrained from moving in the mold. Doing so would extend the overall thermoforming cycle time too much.

One may heat-treat the article for several seconds at about 110° C. while it is constrained from moving in the mold. Doing so would leave as amorphous those regions of the article that have not been oriented. Removal of the article from the hot mold would cause deformation of those regions.

Alternatively, one may reduce the amorphous orientation, an article may be thermoformed at a high temperature, above the half-way temperature between $T_g$ and melt point. At excessively high temperatures such as approaching the melt point would give high sagging of the hot sheet or deformation at its supports and poorly shaped thermoformed articles. Slightly lower temperatures could be problematical due to exudation of oligomer or additives on the surface of the mold giving surface roughness to the molded article. Running at normal thermoforming speeds and about 20° C. above the half-way temperature between $T_g$ and melting temperature (not excessive) gives a molded article having few stretched amorphous PHA molecules and gives reduced shrinkage compared with a molded article having been stretched at a temperature half-way between $T_g$ and the melt point. However, the article will be 90% or more amorphous, which is very soft and deforms easily above the $T_g$, while an article of >10% crystalline is generally desired. A 100% amorphous article may also experience some shrinkage when held for several hours at temperatures around the Tg due to some beginnings of crystallization or other molecular re-arrangements.

Alternatively an article can be made such that the resin is stretched during thermoforming to more than about 200%. Doing so may give clarity and dimensional stability due to strain-induced crystallization process, but this large amount of stretching limits the shape of molded articles to those that are very long and narrow.

One may also increase the crystallinity or rate of crystallization by use of a nucleator for PHA. Many nucleators exist such as particles that are solids at the processing temperature of the PHA and are dispersed to sizes less than about 50-micron. Such particles include naturally occurring minerals especially non-abrasive minerals such as muscovite, montmorillonite, and talcite; other inorganic solids such as nitrides of silicon or boron. Using nucleator introduces haze or opacity to the otherwise transparent PLA articles thereby impairing the value of the articles. See, e.g., U.S. Pat. No. 6,114,495, U.S. Pat. No. 6,417,294, and WO 03014224.

Therefore, there is a need to produce a clear article from PHA and to increase the dimensional stability of the clear article.

SUMMARY OF THE INVENTION

A composition comprises or is produced from poly(hydroxyalkanoic acid), a plasticizer, and optionally a nucleator, impact modifier, or combinations thereof.

An article comprises or is produced from the composition disclosed above.

A process comprises contacting a poly(hydroxyalkanoic acid) composition or poly(hydroxyalkanoic acid) with a nucleator to produce a compound; thermoforming or stretching at a temperature of within 40° C. of the half-way temperature between $T_g$ and the melt point to produce a thermoformed article; heat setting the article constrained from motion at a temperature between $T_g$ and the melt point; recovering the thermoformed or stretched article.

DETAILED DESCRIPTION OF THE INVENTION

"Amorphous" polymer means a sample of PHA that has been heated unconstrained for 12 hours at half-way between Tg and the melting point and when heated in a Differential Scanning Calorimeter (DSC) from ambient to 25° C. above its crystalline melting point at about 10° C./minute, shows less than about 1 J/g for its melting endotherm. Slow crystallization PHA means a sample of PHA that, when heated in a Differential Scanning Calorimeter (DSC) from ambient to 25° C. above its crystalline melting point at about 10° C./minute, shows less than about 1 J/g when the melting endotherm "J/g" is subtracted by the crystallization exotherm "J/g". A fast crystallizing PHA is one that, when amorphous and is heated in the DSC, develops >1 J/g in the crystallization exotherm and especially >20 J/g.

A PHA composition can comprise, consist essentially of, or consist of poly(hydroxyalkanoic acid), a plasticizer, and optionally a nucleator and impact modifier. Based on the weight of the composition, the plasticizer can be present in the composition from about 0.01 to about 30%, about 0.5 to about 20%, about 1 to about 10%, or about 1 to about 5%; the nucleator can be present in the composition from 0 to about 4%, about 0.1 to about 3%, about 0.2 to about 2%, about 0.5 to about 1%; and PHA may make up the rest.

PHA compositions include polymers comprising repeat units derived from one or more hydroxyalkanoic acids having 2 to 15, 2 to 10, 2 to 7, or 2 to 5, carbon atoms. Examples include glycolic acid, lactic acid, 3-hydroxypropionate, 2-hydroxybutyrate, 3-hydroxybutyrate, 4-hydroxybutyrate, 3-hydroxyvalerate, 4-hydroxyvalerate, 5-hydroxyvalerate, 6-hydroxyhexanoic acid, 3-hydroxyhexanoic acid, 4-hydroxyhexanoic acid, 3-hydroxyheptanoic acid, or combinations of two or more thereof. Examples of polymers include poly(glycolic acid) (PGA), poly(lactic acid) (PLA) and poly(hydroxybutyrate) (PHB), polycaprolactone (PCL), or combinations of two or more thereof, including blends of two or more PHA polymers (e.g., blend of PHB and PCL).

PHA can be produced by bulk polymerization. A PHA may be synthesized through the dehydration-polycondensation of the hydroxyalkanoic acid. A PHA may also be synthesized through the dealcoholization-polycondensation of an alkyl ester of polyglycolic acid or by ring-opening polymerization of a cyclic derivative such as the corresponding lactone or cyclic dimeric ester. The bulk polymerization can be carried out by two production processes, i.e., a continuous process and a batch process. Patent application WO1990005157 A1 discloses a process wherein bulk polymerization for cyclic esters is carried out in a twin-screw extruder. Japanese patent application H07-026001 discloses a process for the polymerization for biodegradable polymers, wherein a bimolecular cyclic ester of hydroxycarboxylic acid and one or more lactones are continuously fed to a continuous reaction apparatus having a static mixer for ring-opening polymerization. JPH07-053684 discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. No. 2,668,162 and U.S. Pat. No. 3,297,033 disclose batch processes.

PHA also includes copolymers, preferably not amorphous polymers, comprising more than one PHA comonomer, such as polyhydroxybutyrate-hydroxyvalerate (PHB/V) copolymers and copolymers of glycolic acid and lactic acid (PGA/LA). Copolymers can be produced by copolymerization of a poly(hydroxyalkanoic acid) or derivative with one or more cyclic esters and/or dimeric cyclic esters. Such comonomers include glycolide (1,4-dioxane-2,5-dione), dimeric cyclic ester of glycolic acid, lactide (3,6-dimethyl-1,4-dioxane-2,5-dione), α,α-dimethyl-β-propiolactone, cyclic ester of 2,2-dimethyl-3-hydroxypropanoic acid, β-butyrolactone, cyclic ester of 3-hydroxybutyric acid, δ-valerolactone, cyclic ester of 5-hydroxypentanoic acid, ε-caprolactone, cyclic ester of 6-hydroxyhexanoic acid, and lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., cyclic ester of 12-hydroxydodecanoic acid, and 2-p-dioxanone, cyclic ester of 2-(2-hydroxyethyl)-glycolic acid, or combinations of two or more thereof.

PHA compositions also include copolymers of one or more PHA monomers or derivatives with other comonomers, including aliphatic and aromatic diacid and diol monomers such as succinic acid, adipic acid, and terephthalic acid and ethylene glycol, 1,3-propanediol, and 1,4-butanediol. About 100 different comonomers have been incorporated into PHA polymers. Generally, copolymers having the more moles of comonomer(s) incorporated, the less likely the resulting copolymer is to crystallize.

PHA polymers and copolymers may also be made by living organisms or isolated from plant matter including *Azotobacter, Alcaligenes latus, Comamonas testosterone* and genetically engineered *E. coli* and *Klebsiella*. U.S. Pat. No. 6,323,010 discloses a number of PHA copolymers prepared from genetically modified organisms.

PLA includes poly(lactic acid) homopolymers and copolymers of lactic acid and non-isomer monomers or with isomeric monomers (stereo-isomers) containing at least 50 mole % (50% comonomer gives the least likely copolymer composition to crystallize, no matter what conditions, except for the special case of regular block copolymers or the isomeric monomers) of repeat units derived from lactic acid or its derivatives (mixtures thereof) having a number average molecular weight of 3000 to 1000000, 10000 to 700000, or 20000 to 300000. PLA may contain at least 70 mole % of repeat units derived from (e.g. made by) lactic acid or its derivatives. The lactic acid monomer for PLA homopolymers and optical copolymers can be derived from D-lactic acid (also known as R-lactic acid or (−)-lactic acid), L-lactic acid (also known as S-lactic acid or (+)-lactic acid), or combinations thereof. A combination of two or more PLA polymers can be used. PLA may be produced by catalyzed ring-opening polymerization of the dimeric cyclic ester of lactic acid, which is frequently referred to as "lactide." As a result, PLA is also referred to as "polylactide."

PLA also includes the special class of copolymers and blends of different stereo-isomers of lactic acid or lactide. Melt blends of PLA polymerized from D-lactic acid or D-lactide and PLA polymerized from L-lactic acid or L-lactide can give a stereo-complex between the two stereopure PLAs at a 50/50 ratio. Crystals of the stereo-complex itself has a much higher melt point than either of the two PLA ingredients. Similarly stereo-block PLA can be solid state polymerized from low molecular weight stereo-complex PLA.

Copolymers of lactic acid are typically prepared by catalyzed copolymerization of lactic acid, lactide or another lactic acid derivative with one or more cyclic esters and/or dimeric cyclic esters as described above.

PHA may comprise up to about 99.8 weight %, of the composition, based on the total amount of PHA and nucleator used. For example, the PHA may be present in a range from a lower limit of about 96 to 100 weight %.

Plasticizer is an additive that increases the molecular mobility of a polymer to which it is added. It lowers the $T_g$ for the polymer by more than about 5° C. per percentage of added plasticizer and as much as 3° C. per percentage.

Plasticizers for polymers in general include phthalates (based on esters of polycarboxylic acids with linear or branched aliphatic alcohols of moderate chain length), trimelliates, adipates, sebacates. maleates, epoxidized fatty acids, sulfonamides, organophosphates, polyethers, or combinations of two or more thereof.

Examples of plasticizers in general include bis(2-ethylhexyl)phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate, trimethyl trimellitate, tri-(2-ethylhexyl)trimellitate, tri-(n-octyl,n-decyl)trimellitate, tri-(heptyl,nonyl)trimellitate, n-octyl trimellitate, bis(2-ethylhexyl)adipate, dimethyl adipate, monomethyl adipate, dioctyl adipate, dibutyl sebacate, dibutyl maleate, diisobutyl maleate, benzoate, N-ethyl toluene sulfonamide, N-(2-hydroxypropyl)benzene sulfonamide, N-(n-butyl)benzene sulfonamide, tricresyl phosphate, tributyl phosphate, triethylene glycol dihexanoate, tetraethylene glycol diheptanoate, or combinations of two or more thereof.

Plasticizers suitable for PHA include those with an ability to lower the $T_g$ of the PHA by more than about 0.5° C. per percent of plasticizer added to the PHA. Such compounds are liquids or solids having molecular compatibility with the PHA such that they disperse molecularly into the PHA. The plasticizers have low enough molecular weight so that their $T_g$ is lower than that of the PHA. Their molecular weights are high enough that the plasticizer does not vaporize away from the PHA during melt processing or over time at ambient conditions. Such plasticizers of PHA include organics having more than two methylene linkage acid radicals such as fatty mono- or di-carboxylic acids, alcohols, amides or oligomers of the PHA; alkanediols and their oligomers and polymers; and alkanetriols and their derivatives. Examples of organics having more than two methylene linkage acid radicals include acetyl glycol monolaurate; dibutyl sebacate; lactate acid esters of fatty alcohols such as octyl lactate, 2-ethylhexyl lactate; dimethyl adipate, di(2-ethylhexyl)adipate, diisobutyl adipate, dibutyl adipate, diisodecyl adipate, dibutyldiglycol adipate, di(2-ethylhexyl)adipate, dibutyl sebacate, di(2-ethylhexyl)sebacate, methyl acetylricinoleate, butyl acetylricinoleate, acetyltributylcitric acid, diethyl bishydroxymethyl malonate, bis(2-ethyl lactate)adipate, and bis(octyl lactate) sebacate. Examples of alkanediol plasticizers of PHA include glycol, polyethylene glycol (or ester thereof), polypropylene glycol, diethylene glycol monoacetate, diethylene glycol diacetate, diethylene glycol monopropionate, diethylene glycol dipropionate, diethylene glycol monobutyrate, diethylene glycol dibutyrate, diethylene glycol monovalerate, diethylene glycol divalerate, triethylene glycol monoacetate, triethylene glycol diacetate, triethylene glycol monopropionate, triethylene glycol dipropionate, triethylene glycol monobutyrate, triethylene glycol dibutyrate, triethylene glycol monovalerate, triethylene glycol divalerate, glycerol tripropionate, and poly(1,3-butanediol). Examples of alkanetriol plasticizers include diglycerol triacetate and glycerol monostearate.

A nucleator can include a carboxylic acid or its derivative that does not cause PHA depolymerization. The carboxylic acid or its derivative can include aromatic carboxylic acid (e.g., benzoic acid); aliphatic carboxylic acid (e.g., unsaturated fatty acid such as oleic acid; saturated fatty acid such as stearic acid and behenic acid; fatty acid radical alcohol such as stearyl alcohol; fatty acid ester such as butyl stearate; and fatty acid amide such as stearamide; behenamide); polycarboxylic acid; aliphatic hydroxycarboxylic acid; or combinations of two or more thereof. Wishing not to be bound by theory, film or sheet made from a PHA composition comprising fatty acid derivatives or long chain (e.g., ≧31 carbons) may be less optically clear due to possible difficultly in dispersing these compounds or due to less solubility of these compounds in PHA and due to a mismatch of refractive indices of the PHA and additives.

The nucleating carboxylic acid derivatives can be aliphatic, mono-functional or multi-functional (saturated, unsaturated, or multi-unsaturated) carboxylic acids thereof. The acid may have from about 10 to about 30, about 12 to about 28, about 16 to about 26, or 18 to 22, carbon atoms per molecule. Of particular interest are the acid or derivatives that are on the US Food and Drug Administration (FDA) list as GRAS (generally regarded as safe). Examples of GRAS fatty acid radical derivatives include some mono- and some poly-carboxylic acids such as lactic acid, linoleic acid, malic acid, propionic acid, stearic acid, succinic acid, tannic acid, tartaric acid, stearyl citrate; gylcerol monostearate; diacetyl tartaric acid ester, glyceryl behenate; glycerol monostearate; or combinations of two or more thereof.

The carboxylic acid radical derivatives may have a low volatility (do not volatilize at temperatures of melt blending with PHA) when being melt-blended with PHA or have particles that can well dispersed in PHA such as those having diameters less than about 2μ or are non-migratory (do not bloom to the surface of PHA under normal storage conditions (ambient temperatures)). That is, a desired nucleator has a boiling point higher than the melt processing temperature and pressure of PHA, which is disclosed elsewhere in the application. Examples of such nucleators include lauric acid, palmitic acid, stearic acid, behenic acid, erucic acid, oleic acid, linoleic acid, their amides or esters or combinations of two or more thereof.

The composition can also include, by weight of the composition, about 0.01 to about 30, about 0.5 to about 20, or about 1 to about 10%, a toughening agent such as an ethylene copolymer, a core-shell polymer, polyesters having a secant modulus less than about 200 MP such as highly aliphatic polyesters, or combinations thereof.

An ethylene copolymer may comprise repeat units derived from (a) ethylene; (b) one or more olefins of the formula $CH_2=C(R^3)CO_2R^4$, where $R^3$ is hydrogen or an alkyl group with 1 to 6 carbon atoms, such as methyl, and $R^4$ is glycidyl; and optionally (c) one or more olefins of the formula $CH_2=C(R^1)CO_2R^2$, or carbon monoxide where $R^1$ is hydrogen or an alkyl group with 1 to 8 carbon atoms and $R^2$ is an alkyl group with 1 to 8 carbon atoms, such as methyl, ethyl, or butyl. Repeat units derived from monomer (a) may comprise, based on the copolymer weight, from about 20, 40 or 50% to about 80, 90 or 95%. Repeat units derived from monomer (b) may comprise, based on the copolymer weight, from about 0.5, 2 or 3% to about 17, 20, or 25%. An example of the ethylene copolymer derived from ethylene and glycidyl methacrylate and is referred to as EGMA. Optional monomers (c) can be butyl acrylates or CO. One or more of n-butyl acrylate, tert-butyl acrylate, iso-butyl acrylate, and sec-butyl acrylate may be used. An ethylene copolymer example is derived from ethylene, butyl acrylate, and glycidyl methacrylate (EBAGMA). Repeat units derived from monomer (c), when present, may comprise, based on the copolymer weight, from about 3, 15 or 20% to about 35, 40 or 70%.

If an ethylene copolymer is present in the composition, the carboxylic acid can be in the form of an alkyl ester or an alkylamide where the alkyl group has 4 to about 30 or 10 to about 20 carbon atoms.

A core/shell polymer may not comprise a vinyl aromatic comonomer, and have a refractive index not greater than 1.5; the core comprises one or more elastomers that may comprise polyalkyl acrylate and be optionally cross-linked; the shell comprises non-elastomeric polymer that may include polymethyl methacrylate and optionally contain functional groups including epoxy, carboxylic acid, or amine.

A core-shell polymer may be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage.

A PHA composition can comprise one or more additives including stabilizers, antioxidants, ultraviolet ray absorbers, hydrolytic stabilizers, anti-static agents, dyes or pigments, fillers, fire-retardants, lubricants, reinforcing agents such as flakes, processing aids, antiblock agents, release agents, and/or combinations of two or more thereof.

These additives may be present in the compositions in levels that do not interfere with the stretching or thermoforming process such as, by weight, from 0.01 to 7%, or 0.01 to 5%. For example, the compositions may contain from about 0.01 to about 5% antiblock agents; from about 0.1 to about 1% antioxidants and stabilizers; from about 0.01 to about 1% other solid additives; and/or from about 1 to about 10 weight % flame retardants. Examples of suitable other solid additives include pigments such as titanium oxide, microwave susceptors such as carbon or graphite, induction heated metals such as steel powder or transition metal oxide, and radio frequency heat-sealing susceptors.

The molded or shaped article can have a surface area to thickness ratio greater than about 200:1 inch. The article can also have more than about 10%, 20%, 30%, or even 40% crystallinity (DSC method quantifies "30%" as about 30 J/g melting endotherm for PLA when being heated from amorphous state at a rate of 10° C./minute); crystal lattice sizes smaller than about 100 nm by Small Angle X-ray; a minimal amount of amorphous oriented content defined by a small numerical ratio that is the amount of amorphous orientation versus total crystallinity (such a ratio, which can be defined by x-ray, is the ratio of amorphous orientation determined by x-ray to total crystallinity determined by x-ray should be less than about 2 or preferably less than about 1 or more preferably less than about 0.1; alternatively the numerical ratio is the DSC determined joules per gram for the transition endotherm between the $T_g$ and about 20° C. above the $T_g$); having the Refractive Index (RI) difference in the plane of the sheet between the maximum RI and the minimum RI of less than about 0.05: having a Refractive Index difference between that of the plane of the article and the thickness direction of the article between about 0.1 and 0.2.

A thermoforming process comprises contacting a PHA composition or PHA with a nucleator to produce a compound. The contacting can include mixing PHA and nucleator till the nucleator is substantially or even homogeneously dispersed. Any impact modifiers (e.g. ethylene-acrylate copolymers, ionomers, grafted polymers) and additives may be also dispersed in the composition. Any mixing methods known in the art may be used. For example, the component materials may be mixed to substantially dispersed or homogeneous using a melt-mixer such as a single or twin-screw extruder, blender, Buss Kneader, double helix Atlantic mixer, Banbury mixer, roll mixer, etc., to give a resin composition.

The contacting can include a melt-mixing temperature in the range above the softening point of the PHA and below the depolymerization temperature of the PHA of about 100° C. to about 300° C., about 110° C. to about 280° C., or especially about 130° C. to about 240° C. at an ambient pressure or in the range of 0 to about 60 MPa or 0 to about 34 MPa. The condition creates sufficiently high shear history to disperse the nucleator into small particles and distribute them uniformly through the melted PHA and sufficiently low shear history to avoid excessive loss of PHA molecular weight and its embrittlement. Shear history is the concept of the amount to shear over duration of time. A melt experiences more shear history when it experiences high shear for a long time than when it experiences high shear for a short time. Similarly a melt experiences more shear history when it experiences medium shear for a time than when it experiences very low shear for a long time. The shear history of plastics processing equipment may be complicated by differing shear rates and duration times within the equipment for example in a size screw extruder producing pellets the screw has low shear rates and long durations within the channels of the screw but high screws rates and low durations between the screw and the walls of the extruder. In general insufficiently high shear history is achieved by use of less than about 2 minutes of mixing from introduce of the ambient temperature ingredients into a heated batch twin blend mixer using rotor blade mixer that may be co- or counter-rotating or the use of at less than 10:1 length to diameter ratio trilobal, co-rotating twin screw extruder using a screw that contains less than 10% length of screw elements that are either kneading blocks or reverse elements, the rest being forward conveying sections. For example, a sufficiently high shear history can result from use of at least 3 minutes on the batch unit and at least 20:1 L:D (length to diameter) ratio on the continuous unit and an excessively high shear history may result from more than 40 minutes in the batch unit or a 50:1 L:D ratio in the continuous unit. Other processing equipment can be used for melt mixing such as a single screw extruder, counter rotating twin screw extruder, or roll mill. Also useful processors may include bilobal twin screw extruders and single screw extruders with mixing torpedoes at the end of the screw. The carboxylic acid may be present in a sufficiently high or ≧0.1% crystallization-improving amount thereby providing heat resistance at $T_g$ or above. Not to be bound by theory, if the nucleator is present at too high a level, it may cause the melt blend viscosity and melt strength to be too low for subsequence processing into pellets, sheeting, or thermoformed articles. For example, whereas pellets of a concentrate of carboxylic acid in PHA may be formed via under-water pelletization if the nucleator additive level is less than about 50%, amorphous sheeting requires that level to be less than about 10% for sufficiently high melt strength. Furthermore the size of nucleator particles having unmatched refractive indexes with the PHA may be less than about 500 nm, less than about 300 nm, or even less than 80 nm for low haze. The difficulty of dispersing nucleator to small sizes may increase with amount of nucleator used and its solubility in the PHA. In general more than about 2% nucleator in the PHA may lead to hazy blends. For example, more than 3% or more than about 5% may give too high a level of haze irrespective of the type of mixing used.

Alternatively, a portion of the component materials can be mixed in a melt-mixer, and the rest of the component materials subsequently added and further melt-mixed until substantially dispersed or homogeneous. The resulting composition is a concentrate of nucleator in PHA and can comprise, by weight of the composition, 50 to 90 or 60 to 70% PHA and 10 to 50 or 30 to 40% of nucleator.

The fully melt mixed composition may be molded into articles using any melt-processing technique suitable for PHA provided the processing into the finished article is done in a manner to achieve low haze with high crystallinity. Commonly used melt-molding methods known in the art to achieve low haze and crystallinity can include injection molding of a pre-formed shape of low crystallinity followed by blow molding or expanding that shape above its Tg, profile extrusion molding with stretching, casting a low crystallinity sheet followed by its thermoforming into an article or extrusion blow molding. The compositions also may be melt-formed into films by extrusion or calendaring to prepare amorphous cast film. Those cast film that are amorphous may be further stretched into films or straps.

The compositions may also be used to form films, rods, profiles, sheets, fibers and filaments that may be unoriented and crystalline and having some haze, or unoriented and amorphous semifinished articles, or oriented from the melt such as blown film or at a later stage oriented by heating a nearly amorphous semifinished article such as by injection stretch blown molding or thermoforming.

The compositions may be formed into films or sheets by extrusion through either slot dies to prepare cast films or sheets or annular dies to prepare blown films or sheets followed by thermoforming into articles and structures that are oriented from the melt or at a later stage in the processing of the composition.

To achieve the full benefit clarity and thermal benefit of the nucleator, the making of any amorphous semi-finished article desirably avoid excessive crystallinity and the making of the finished article desirably avoid both insufficient crystallinity and excessively large crystals of PHA for those parts of the article valuing transparency. To avoid excessive crystallinity which may inhibit subsequent forming or stretching of articles and/or introduces large hazy crystals, the making of amorphous sheet or articles of PHA involves using melted PHA more than 20° C. above the peak melting point to provide a controlled or consistent amount of nucleator by avoiding fortuitous nucleators. The resulting extruded sheet or shape can then be cooled rapidly to the $T_g$ in order to have low crystallinity. For thick profiles, the cooling rate of the interior of the profile may be benefited by use of the coldest temperature practical on the exterior of the article. That temperature is desirably below the glass transition temperature of the PHA. For example, for PHA having a glass transition temperature of about 50° C. and sheeting thickness of about 700μ may benefit from using one-side quenching temperatures of 10° C. whereas 500μ sheet can be made amorphous using 20° C. one-sided quench conditions. Quench temperatures above about 40° C. may not be as useful because the melt contacting such surfaces can cool too slowly and/or stink to such surfaces if the glass transition temperature is about 40° C. The exact minimum temperature may decrease when a PHA is used that is inherently slower at crystallizing or when a lower amount of nucleator is used or when the article is cooled or quenched from all sides versus one side or when the $T_g$ of the PHA is lower.

The composition in the form of a low crystallinity sheet can then be thermoformed in a heated mold by first being heated. It is heated to within 40° C. of the half-way temperature between Tg and the melt point, or to within 20° C., or within 10° C. In heating the amorphous semi-finished article it may be first heated by conductive, convective, or radiative heating. With radiative heating, the article is exposed to black-body radiation temperatures ranging from 200° C. to about 700° C. Time in a 230° C. black body radiator may range from about 10 seconds to about 70 seconds, or from 20 seconds to 60 seconds, or 30 seconds to 50 seconds for a 600μ thick profiles heated from both sides.

The heated mold can be any mold known to one skilled in the art such as trays, cup, cap, bowl, or lid. For example, a mold can be made with aluminum or ceramic. In forming the heated amorphous semi-finished article into a finished transparent, crystalline article the semi-finished article may be stretched at sufficiently high speeds and high stretch ratios to cause crystallization and to enable those crystallites to be small enough to not cause haze. Stretch rate may be about 10% to about 1000% per second, or between 20% per second and 600% per second. Stretch ratios may be about 20% (post stretch length is 150% of the pre-stretched dimension) to about 800%, or 50% to 700%, or 100% to 300%. Not wishing to be bound by theory, slow stretch rates may give haze or incompletely formed articles and too high stretch rates may give insufficiently high crystallinity resulting in finished articles which have poor dimensional stability above the glass transition temperature. Low stretch ratios may not induce enough crystallinity within the short time of the thermoforming process or cause haze in the finished article and too high a stretch ratio may cause excessive thinning or tearing of the article. The exact stretch ratio may be higher for unbalanced or one-dimensional stretching or articles which not cooled during the stretching operation such as is the case for vacuum, pressure-assisted, or no physical "plug assistance". Otherwise those parts of the article that are cooled during the stretch operation may experience haze or poor dimensional stability.

Upon completion of the thermoforming or stretching process, the formed article can be held constrained in the heated mold for additional about 1 to about 120 seconds, about 2 to about 100 seconds, about 10 to about 45 seconds, to heat set the molded article and therefore reduce amorphous orientation.

Wishing not to be bound by theory, the mold temperature is higher than the polymer's $T_g$, or the oriented molecules would not move and relax no matter how long in the mold. Lower mold temperatures also increase the required time. For example, a PHA having a half-way temperature of 110° C., $T_g$ of 55° C., and melt point of 150° C., holding at 80° C. for even 30 seconds may produce high shrinkage whereas holding at 100° C. for 10 seconds gives less shrinkage. Accordingly, the mold temperature is desirably higher than 25% from $T_g$ to the melt point, or 50% from $T_g$ to melt point or 75% from $T_g$ to melt point.

The film may be a single layer of the PHA composition (a monolayer sheet) or a multilayer film or sheet comprising a layer of the PHA composition and at least one additional layer comprising a different material.

For packaging applications, a multilayer film may involve three or more layers including an outermost structural or abuse layer, an inner or interior barrier layer, and an innermost layer making contact with and compatible with the intended contents of the package and capable of forming any needed seals. Other layers may also be present to serve as adhesive layers to help bond these layers together. The thickness of each layer can range from about 10 to about 200 μm.

The outermost structural or abuse layer may be prepared from the PHA composition. Additional structure layers may include oriented polyester or oriented polypropylene, but can also include oriented polyamide (nylon). The structure layer can be printed, for example, by reverse printing using rotogravure methods.

The inner layer can include one or more barrier layers to reduce the permeation rate through the layer by agents such as water, oxygen, carbon dioxide, electromagnetic radiation such as ultraviolet radiation, and methanol that potentially can affect the product inside therein. Barrier layers can comprise, for example, metallized polypropylene or polyethylene terephthalate, ethylene vinyl alcohol, polyvinyl alcohol, polyvinylidene chloride, aluminum foil located so as not to interfere with the optical value of the PHA such as to readthrough to the print layer, silicon oxides ($SiO_x$), aluminum oxide, aromatic nylon, blends or composites of the same as well as related copolymers thereof.

The innermost layer of the package can be the sealant and can be a polymer layer or coating that can be bonded to itself (sealed) or other film or substrate at temperatures substantially below the melting temperature of the outermost layer. Sealants are well known and can be commercially available from E. I. du Pont de Nemours and Company (DuPont), Wilmington, Del. Substrate can include foil, paper or nonwoven fibrous material.

A multilayer film can be produced by any methods well known to one skilled in the art such as, for example, coextrusion and can be laminated onto one or more other layers or substrates. Other suitable converting techniques are, for example, blown film (co)extrusion and extrusion coating.

Films can be used to prepare packaging materials such as containers, pouches and lidding, balloons, labels, tamper-evident bands, or engineering articles such as filaments, tapes and straps.

The disclosure uses film as example and is applicable to sheet, which is thicker than film.

The article can be in other forms such as shaped articles or molded articles. Containers and packaging materials can be of various shapes including trays, cups, caps, bowls, or lids prepared from sheets by vacuum or pressure forming. Other shapes include those prepared by deep drawing an unstretched sheet (i.e. thermoforming), by extrusion blow molding or biaxial stretching blowing parisons (injection stretch blow molding), by injection molding, compression molding or other molding processes; profile extruded articles; carton; squeezable tubes, pouches or bottles; components of containers; bags or pouches within a rigid container that dispense liquids such as wine, medical fluids, baby formula; clam shells, and blister packs.

The thermoformed article can be recovered by any methods known to one skilled in the art.

A film or sheet could be thermoformed to produce a concave surface such as a tray, cup, can, bucket, tub, box or bowl. Thermoformed articles may be combined with additional elements, such as a generally planar film sealed to the thermoformed article that serves as a lid (a lidding film).

Products that can be packaged include food and non-food items including beverages (e.g., carbonated beverages, orange juice, apple juice, grape juice, other fruit juices and milk), solid foods (e.g., meats, cheese, fish, poultry, nuts, coffee, applesauce or other sauces, stews, dried fruit, food paste, soups and soup concentrates and other edible items), spices, condiments (e.g., ketchup, mustard, and mayonnaise), pet food, cosmetics, personal care products (e.g., toothpaste, shaving foam, soaps, shampoos, lotions and the like), pharmaceuticals, fragrances, electronic components, industrial chemicals or household chemicals (e.g., laundry detergent, fabric softener), agrochemicals, medical devices and equipment, medicinal liquids, fuels, and biological substances.

Films may also be slit into narrow tapes and drawn further to provide slit film fibers for use as degradable sutures.

The following Examples are illustrative, and are not to be construed as limiting the scope of the invention.

EXAMPLES

The example illustrates the invention in making thermoformed cups.

Materials

PLA2002D pellets were purchased from NatureWorks LLC (Minnetonka, Minn. USA) and had a melt viscosity about 1500 Pa·s (190° C. and 100 $s^{-1}$), a $T_g$ of about 55° C., a melt point maximum endotherm at 150° C., and crystallinity generated with a second 10° C./minute heating of pellets previously heated to complete melting at 250° C. and cooled to 20° C. of about 0.5 J/g.

PLA4032D pellets were also purchased from NatureWorks LLC and had a $T_g$ of about 58° C. and melt point maximum endotherm at 166° C. and crystallinity of about 6 J/g using the above method making it a faster crystallizing PLA then PLA2002D.

PLA3001D pellets were also purchased from NatureWorks LLC and had a $T_g$ of about 61° C. and melt point maximum endotherm at 171° C. and crystallinity of about 6 J/g.

Stearic acid was obtained from Aldrich (Batch 11821LC) 95% pure.

Behenamide was Crodamide® BR available from Croda Inc, Edison, N.J.

Ethylene bis-stearamide (CAS=110-30-5) was obtained from Aldrich (434671-3KG).

EBAGMA was an autoclave-produced ethylene/n-butyl acrylate/glycidyl methacrylate terpolymer (monomer ratio 66.75 wt % ethylene, 28 wt % n-butyl acrylate, 5.25 wt % glycidyl methacrylate, melt index 12 dg/minute, 190° C., 2.16 kg load, melting range 50° C. to 80° C.).

Several additives were received from C. P. Hall (Chicago, Ill.): RX14010 was bis(2-ethyl lactate)adipate mixture; $T_g$, −37° C.; MW 334. RX14028 was bis(capryl lactate)sebacate mixture; MW 570. RX3020 was a proprietary ester or octanol and fatty acid. Plasthall 809 is a polyethylene glycol 400 di-2-ethylhexanoate, and Plasthall 207 is dibutoxyethyl sebacate aka decanedioic acid, 1,10-bis(2-butoxyethyl) ester, Plasthall 7050 is a monomeric plasticizer which is dialkylether glutarate.

Caradol ED 52-03 was obtained from Shell Chemical LP (Houston, Tex.) it is a polyoxyalkylene diol (CAS=9003-11-6).

Uniplex 810 was obtained from Unitex Chemical Corporation (Greensboro, N.C.), it is a polyethylene glycol 600 di-laurate aka Poly(oxy-1,2-ethenediyl), a-(1-oxododecyl)-w-[(1-oxydodecyl)oxy]-.

Plastolein 9058 was obtained from Henkel Corporation (Gulph Mills, Pa.), it is a bis(2-ethylhexyl)nonanedioate.

Terethane® 2900 is a polytetramethylene glycol of molecular weight 2825-2975 g/mole obtained from DuPont.

Citroflex A-2 is acetyl triethyl citrate obtained from Morflex Incorporated (Greensboro, N.C.).

Analytical Equipment and Methods

Batch blending was accomplished on a Haake Rheocord 9000 using roller blade rotors and a 55 g mixing chamber operated by preheating the unit to goal melt temperature, then running rotors, starting the clock, charging about 55 g of ingredients within about a 15 second period, closing the lid, and recording the torque, time, and melt temperature. When complete the melt mass was discharged onto a cold container, cooled to ambient and sealed.

Continuous melt blending with amorphous sheet extrusion was accomplished on a Werner&Pfleiderer (W&P process) 30A mm twin screw extruder with coat hanger die and quench drum. The extruder used an 890 mm long screw. Pellets and additives entered about 70 mm from the top of the screw as a solid mixture. The screw used forward conveying segments for most of its length and about 3% of its length used kneading blocks. The unit was operated at about 125 rpm with a melt temperature of 190° C. to 220° C. The melt passed through a coat hanger die (20 cm width and a 0.76 mm die gap) at about 10 kg/hr to 20 kg/hr using a Foremost volumetric pellet feeder. The melt curtain fell vertically about 5 cm to a quench drum cooled to 10° C. to 23° C. The drum rotation speed was set to minimum melt draw. Sheet thickness was controlled between about 250 micron and about 750 micron by varying the throughput rate of the polymer feed.

Continuous melt blending with pellet extrusion was conducted on a Prism A PM-44 16 mm bilobal twin screw extruder. The conditions were 200 rpm and 240° C. melt point. The molten strand was extruded into a water bath held at 0° C. with ice prior to pelletization to provide a pellet amorphous or freed of crystallinity.

DSC was used to measure the crystallization speed and amount of crystallization of an amorphous sample during heating above its glass transition temperature. One method for measuring higher speeds of crystallization was to record the lowered crystallization temperatures which would be the temperature for the peak of the crystallization exotherm during heating. Crystallization exotherm measurements were conducted on a TA Instruments (New Castle, Del.) Model Q1000 and operated on about 5 to 10 mg of sample with 10° C./minute heating from ambient to 250° C. (in most cases) (in the case of PLA melting at 150° C. to 180° C.). The first heating can generate a glass transition temperature at the inflection of heat flow, a measure of amorphous orientation is available as an endotherm between $T_g$ and about 20° C. above $T_g$, crystallization exotherm when the semicrystalline or amorphous polymer crystallizes (a fully crystalline polymer will not crystallize in the first heat), and at higher temperatures an endotherm is generated that is the polymer crystals melting. The second heating is used to judge the thermal stability of the PLA plus additive system. PLA is thermally stressed above about 230° C. and the first heat takes the PLA up above to that temperature for 2 minutes. If the additive affects stability it might show up as a reduction of glass transition temperature or change in the crystallization behavior. The second heat is also used as an additional way to judge the crystallization speed (temperature for the exotherm) for a sample starting with a common thermal history of being heated well above the melt point to eliminate any fortuitous nucleators and being cooled down at a special rate to a common temperature. The "J/g" for the exotherm minus the "J/g" for the endotherm is an approximate measure of the amount of crystallinity in the original sample.

Another method for judging crystallization speed is to record the half-time of crystallization for a semicrystalline or amorphous samples undergoing crystallization at various isothermal temperatures. Half-time determinations were conducted on a Perkin Elmer DSC unit using about 10 mg of sample, heating from 25° C. to the isothermal temperature at 200° C./minute, and holding at the isothermal temperature for at least 10 minutes. The half-time was determined as the time duration at the isotherm for the maximum of the area under the exotherm. This method also provides a measure of the total amount of crystallinity developed at the isotherm as Joules per gram of sample.

Shrinkage was measured as a percentage change in machine direction (stretch direction) length when an unconstrained sample was exposed to 60° C. water for 30 seconds.

Haze was assessed using ASTM D1003 rev 92. The haze is reported is "internal haze", i.e., any surface roughness effecting haze was minimized by a liquid lubricating coating. The samples tested for haze were made amorphous in their PHA content by rapidly cooling the 250 μm to 750 μm thick extruded melt curtain on a quenching drum cooled to 10° C. to 23° C. Alternatively, thick samples of sheeting or samples from batch blends were compression molded at 190° C. into 254 μm thick molds using a 2 minute long mold and hold cycle. The molds were immediately transferred and rapidly cooled in water cooled molds. The final heat set article is substantially clear or contact clear and, preferably, has a haze or less than 30 or 20 or 10 or 5 or even 2.

In an experiment PLA2002D by itself was blended in the Haake unit and tested for crystallization. It showed Comparative Example 13 (Table 1) very high crystallization temperatures and also small amounts for developed crystallinity.

Blends were prepared of the ingredients shown in Table 1 (numbers in grams except Examples 14 and 15 where the numbers in weight %). Examples 1-12 were blends prepared on the Haake batch unit by the technique described above except samplings were taken after 3 minutes of mixing, 6 minutes, and 10 minutes of mixing (the time of mixing was measured in minutes; 2002D denotes PLA2002D and 4032D denotes PLA4032D; SA is abbreviation for stearic acid; plasticizers used were 14010 (RX14010), 14028 (RX14028), and 3020 (RX3020); BA was behenamide; and EBS was ethylene bis-stearamide).

TABLE 1

|       | Time | 2002D | 4032D | SA  | 14010 | 14028 | 3020 | BA  | EBAGMA | EBS |
|-------|------|-------|-------|-----|-------|-------|------|-----|--------|-----|
| Ex 1  | 3    | 54    |       | 1.1 |       |       |      |     |        |     |
| Ex 2  | 6    | 54    |       | 1.1 |       |       |      |     |        |     |
| Ex 3  | 10   | 54    |       | 1.1 |       |       |      |     |        |     |
| Ex 4  | 3    | 53    |       |     |       | 2.8   |      |     |        |     |
| Ex 5  | 6    | 53    |       |     |       | 2.8   |      |     |        |     |
| Ex 6  | 10   | 53    |       |     |       | 2.8   |      |     |        |     |
| Ex 7  | 3    | 54    |       |     |       |       |      | 1.1 |        |     |
| Ex 8  | 6    | 54    |       |     |       |       |      | 1.1 |        |     |
| Ex 9  | 10   | 54    |       |     |       |       |      | 1.1 |        |     |
| Ex 10 | 3    | 51    |       | 1.1 |       | 2.8   |      |     |        |     |
| Ex 11 | 6    | 51    |       | 1.1 |       | 2.8   |      |     |        |     |
| Ex 12 | 10   | 51    |       | 1.1 |       | 2.8   |      |     |        |     |

TABLE 1-continued

|  | Time | 2002D | 4032D | SA | 14010 | 14028 | 3020 | BA | EBAGMA | EBS |
|---|---|---|---|---|---|---|---|---|---|---|
| Ex 13 | 5 | 55 | | | | | | | | |
| Ex 14 | | 99 | | 1 | | | | | | |
| Ex 15 | | 97.1 | | 2.9 | | | | | | |
| Ex 16 | 5 | 54.5 | | 0.6 | | | | | | |
| Ex 17 | 5 | 52 | | 0.6 | | | 2.8 | | | |
| Ex 18 | 5 | 51 | | | | | 2.8 | 0.6 | 0.6 | |
| Ex 19 | 6 | 53.9 | | 0.55 | 0.55 | | | | | |
| Ex 20 | 6 | 53.35 | | 0.55 | | | 1.1 | | | |
| Ex 21 | 6 | 52.25 | | | | | 2.75 | | | |
| Ex 22 | 6 | 52.25 | | 2.75 | | | | | | |
| Ex 23 | 6 | 54.45 | | | | | | | | 0.55 |
| Ex 24 | 6 | 53.35 | | | | | 1.1 | | | 0.55 |
| Ex 25 | 6 | 53.9 | | | | | | 0.55 | 0.55 | |
| Ex 26 | 6 | 52.8 | | | | | 1.1 | 0.55 | 0.55 | |
| Ex 27 | 6 | | 54.45 | | | | | | | 0.55 |
| Ex 28 | 6 | | 53.9 | | | | | 0.55 | 0.55 | |
| Ex 29 | 6 | | 52.8 | | | | 1.1 | 0.55 | 0.55 | |

The material sampled was tested by the DSC method for crystallization rate and extent. Comparative Examples (i.e. Examples 1-6) show much improved crystallization properties with the use of plasticizer or stearic acid nucleator over unmodified PLA2002D (Example 13). Examples 10-12 versus Comparative Examples 1-6 show that the combination of fatty acid nucleator and plasticizer gave the lowest crystallization temperature ("exotherm") than stearic acid itself or plasticizer itself with high crystallinity of more than 10% (about 10 J/g).

Another series of Haake blend experiments (Examples 16-22) were conducted with one sampling after 5 or 6 minutes of mixing. Example 17 shows the combination of stearic acid and plasticizer gave lower crystallization temperature and higher crystallinity than the use of plasticizer alone (Comparative Example 21) or stearic acid alone (Comparative Example 16) or than a much higher loading of stearic acid alone (Comparative Example 22). Example 18 shows the combining behenamide and EBAGMA with plasticizer gave better results than behenamide and EBAGMA alone (Example 21). Example 20 shows the combination of stearic acid with plasticizer gave lower crystallization temperatures than stearic acid alone (Comparative Example 16).

Another series of tests were conducted by Haake blending Examples 23-24 and showed that combining plasticize and ethylene bis-stearamide nucleator (Example 24) gave lower crystallization temperatures than nucleator alone (Comparative Example 23).

Similar blends showed the value of nucleator plus plasticizer versus nucleator alone even with the blended PLA being the inherently faster crystallizing PLA4032D (Example 26 versus Comparative Example 25) and versus Comparative Example 21 which used much higher loadings of plasticizer) (Example 29 versus Comparative Example 28).

In Table 2, "1st heat $T_g$" is $T_g$ during the first heat-up temperature (° C.); "1st exo" (exotherm) is the area under the crystallization exotherm when plotting "heat flow" versus increasingly high temperature; "1st endo" (endotherm) is the area under the melting endotherm when plotting "heat flow" versus increasingly high temperature; the "max temp" is the temperature for maximum heat flow of the 1st exotherm; "2nd heat $T_g$" is $T_g$ during the second heat-up temperature (° C.); "2nd exo" is the area under the crystallization exotherm that occurred after the sample had first been heated to 200° C. or 250° C. and cooled to ambient, "2nd endo" is the melting point of the sample when it is melted during the second heat-up cycle. There could be some overlap between the end of the $2^{nd}$ exotherm and the start of the $2^{nd}$ endotherm; therefore the uncertainty in the J/g values was about +/−10%.

TABLE 2

|  | 1st Heat | $1^{st}$ Exo (J/g) | $1^{st}$ Exo (° C.) | $1^{st}$ Endo (J/g) | Max temp | $2^{nd}$ Heat | $2^{nd}$ Exo (J/g) | $2^{nd}$ Exo (° C.) |
|---|---|---|---|---|---|---|---|---|
| Ex 1 | 49 | 27 | 86 | 31 | 250 | 57 | 33 | 113 |
| Ex 2 | 50 | 30 | 99 | 34 | 250 | 57 | 34 | 112 |
| Ex 3 | 50 | 30 | 99 | 33 | 250 | 57 | 33 | 113 |
| Ex 4 | 46 | 28 | 109 | 30 | 250 | 53 | 27 | 120 |
| Ex 5 | 46 | 27 | 107 | 31 | 250 | 52 | 25 | 120 |
| Ex 6 | 46 | 32 | 109 | 35 | 250 | 50 | 31 | 118 |
| Ex 7 | 53 | 23 | 119 | 24 | 250 | 57 | 10 | 129 |
| Ex 8 | 52 | 24 | 118 | 29 | 250 | 57 | 13 | 128 |
| Ex 9 | 52 | 27 | 117 | 30 | 250 | 57 | 16 | 128 |
| Ex 10 | 46 | 24 | 91 | 32 | 250 | 50 | 27 | 103 |
| Ex 11 | 45 | 27 | 90 | 28 | 250 | 50 | 26 | 102 |
| Ex 12 | 44 | 28 | 86 | 33 | 250 | 49 | 37 | 106 |
| Ex 13 | 58 | 12 | 129 | 13 | 200 | 59 | 3.5 | 113 |
| Ex 16 | 60 | 21 | 122 | 24 | 250 | 60 | 10 | 129 |
| Ex 17 | 50 | 28 | 98 | 38 | 250 | 52 | 33 | 112 |
| Ex 18 | 55 | 22 | 92 | 29 | 250 | 56 | 29 | 98 |
| Ex 19 | 56 | 10 | 121 | 10.4 | 250 | | 0 | — |
| Ex 20 | 55 | 26 | 111 | 27 | 250 | | 11 | 126 |
| Ex 21 | 52 | 25.7 | 100 | 30.7 | 250 | | 18.7 | 123 |

TABLE 2-continued

| | 1st Heat | 1st Exo (J/g) | 1st Exo (° C.) | 1st Endo (J/g) | Max temp | 2nd Heat | 2nd Exo (J/g) | 2nd Exo (° C.) |
|---|---|---|---|---|---|---|---|---|
| Ex 22 | 56 | 30 | 103 | 32.8 | 250 | | 34.5 | 116 |
| Ex 23 | 58 | 23.8 | 115 | 28.2 | 250 | | 5.6 | 128 |
| Ex 24 | 56 | 24.7 | 106 | 28.7 | 250 | | 5.6 | 127 |
| Ex 25 | 55 | 24.8 | 100 | 27.6 | 250 | | 26.6 | 102 |
| Ex 26 | 55 | 23.3 | 95 | 28.8 | 250 | | 26.1 | 100 |
| Ex 27 | 60 | 27.9 | 100 | 44.4 | 250 | | 18.6 | 99 |
| Ex 28 | 60 | 18.1 | 89 | 45.4 | 250 | | 19.9 | 91 |
| Ex 29 | 55 | 19.4 | 85 | 47.5 | 250 | | 21.7 | 88 |

In another series of experiments (Examples 14 and 15) PLA2002D was blended with stearic acid in an extruder. The samples as well as those of Example 11 and 13 were DSC tested in a different manner to evaluate crystallization speed. The sample was heated at 30° C./minute from ambient to 110° C., then cooled at 30° C./minute to ambient, and then heated at 30° C./minute to 250° C. The crystallinity developed during the heating and cooling was recorded by subtracting the second heat melting endotherm by the second heat crystallization exotherm. Table 3 shows that the addition of plasticizer (Example 11) with nucleator increased the amount of developed crystallinity (compared with Examples 13, 14, 15).

TABLE 3

| | Crystallinity developed during 110° C. Ovening (J/g) |
|---|---|
| Ex 11 | 33 |
| Ex 13 | 5 |
| Ex 14 | 25.5 |
| Ex 15 | 26 |

The samples of Examples 18 and comparative Examples 21 and 25 were compression molded at 210° C. and quenched rapidly into about 10-mil amorphous sheets. The sheets were cut into 0.5-inch wide strips and stretched at 100° C. uniaxially 100% followed by rapid quenched by direct contact onto ambient surfaces (about 22° C.). The stretched sheets were heat treated at 80° C. for 10 seconds while being constrained from shrinking in the stretch direction. The sheets were immediately quenched by direct contact to 22° C. surfaces. The resulting sample was tested for un-constrained shrinkage in the stretch direction in 60° C. water during 45 seconds. Comparative Example 21 measured 10% shrinkage. Comparative Example 25 had 7% shrinkage and Example 18 had 7% shrinkage. These results show the value of fatty acid derivatives in addition to plasticizer for minimizing shrinkage of polyhydroxy alkanoates.

Materials of Comparative Example 14 and Example 15 and of PLA2002D were tested for half-time at 90° C. Comparative Example 14 and 15 had half-times of 24 minutes and 2.5 minutes respectively. PLA2002D had a half-time far higher longer than 24 minutes. These results show that the fatty acid derivative improved half-time and degree of crystallinity even though the half-time could be improved further.

The internal haze for the 17 mil thick sample of Comparative Example 14 was 1.3% and the internal haze for Comparative Example 15 was 1%.

The half-time for unmodified PLA3001D pellets was recorded using the DSC method described above. Its half time at 88° C. and at 95° C. was 10 minutes and 3 minutes respectively. For temperatures cooler than 88° C. its half-time could be longer than 10 minutes. In series of experiments, PLA3001D was blended with additive and pelletized as amorphous pellets of minimal crystalline content on the Prism extruder as described earlier. The resulting pellets were analyzed for half-time of crystallization at 75° C., 80° C., and 85° C.

Table 4 shows that Examples 39, 30, 40, and 42 (blends of PLA3001 with polyethylene glycol, polytetramethylene glycol, and esters of polyethylene glycol) gave rapid crystallization speeds of less than about 2 minutes at 80° C. versus much slower crystallization of 10-minutes or longer of unmodified PLA3001 but retaining low degrees of crystallinity of less than about 7%. Comparative Examples 34, 36 and 44 show that blends of PLA3001 with fatty acid derivatives gave higher crystallinity than the polyethylene glycols but not as fast crystallization speeds. Examples 43, 33, 41, and 35) show that a combination of polyethylene glycol or ester and fatty acid derivative gave both fast crystallization speeds better than about 2 minutes half-time at 80° C. and high levels of crystallinity greater than about 10%.

TABLE 4

| | | Half Times (minutes) Isothermal Temp (° C.) | | | Crystallinity Developed (J/g) | | |
|---|---|---|---|---|---|---|---|
| | Additive (%) | 75 | 80 | 85 | 75 | 80 | 85 |
| EX 30 | Plasthall 809 (4) | 3.03 | 2.23 | 1.15 | 2.9 | 2.3 | 1.2 |
| EX 31 | Plasthall 809 (2) + Citroflex A-2 (2) | 5.83 | 3.47 | 2.03 | 11.5 | 16.2 | 12 |
| EX 32 | Citroflex A-2 (4) | 10.83 | 5.32 | 2.68 | 17.4 | 17.8 | 12.6 |
| EX 33 | Plasthall 809 (2) + Plasthall 207 (2) | 5.23 | 2.55 | 1.47 | 4.9 | 7.1 | 10.1 |
| EX 34 | Plasthall 207 (4) | 5.25 | 2.67 | 1.5 | 2.9 | 8.5 | 1.4 |
| EX 35 | Plasthall 809 (2) + Plastolein 9058 (2) | 7.47 | 2 | 1.3 | 7.3 | 8.2 | 0.1 |
| EX 36 | Plastolein 9058 (4) | 9.55 | 4.5 | 2.22 | 9.6 | 5.8 | 3 |
| EX 37 | Plasthall 809 (2) + Caradol ED5203 (2) | 3.25 | 1.85 | 1.18 | 12.6 | 1.9 | 5.4 |
| EX 38 | Caradol ED5203 (4) | 3.18 | 1.7 | 1.07 | 6.5 | 7.9 | 11.5 |
| EX 39 | Plasthall 809 (2) + Terethane 2900 (2) | 2.55 | 1.8 | 1.13 | 4.1 | 0.3 | 0.05 |
| EX 40 | Terethane 2900 (4) | 7.5 | 4.15 | 2.57 | 1.2 | 2.9 | 2 |
| EX 41 | Plasthall 809 (2) + 2% Uniplex 810 (2) | 3.15 | 1.75 | 1.17 | 7.7 | 5.8 | 9.1 |
| EX 42 | Uniplex 810 (4) | 3.57 | 1.8 | 1.18 | 7 | 6.1 | 3.4 |
| EX 43 | Plasthall 809 (2) + Plasthall 7050 (2) | 4.72 | 2.17 | 1.32 | 8.3 | 11.1 | 10 |
| EX 44 | Plasthall 7050 (4) | 3.98 | 2.4 | 1.52 | 10.9 | 3 | 10.9 |

The invention claimed is:

1. A composition comprising or produced from poly(hydroxyalkanoic acid) (PHA), a nucleator, an ethylene copolymer, and optionally a plasticizer wherein
the plasticizer includes phthalate, trimellitate, adipate, sebacate, maleate, epoxidized fatty acid, sulfonamide, organophosphate, polyether, organic compound having more than two methylene linkage acid radicals, amide or oligomers of the PHA, alkanediol, alkanediol derivative, alkanetriol, alkanetriol derivative, polyoxyalkylene diol, or combinations of two or more thereof;

the ethylene copolymer comprises repeat units derived from ethylene, a glycidyl-containing olefin, and a butyl acrylate or carbon monoxide; and the nucleator includes one or more carboxylic acids or, if the composition comprises the ethylene copolymer, an alkyl ester of the carboxylic acid, alkyl amide of the carboxylic acid, or combinations thereof; and the carboxylic acid includes aromatic carboxylic acid, aliphatic carboxylic acid, polycarboxylic acid, aliphatic hydroxycarboxylic acid, or combinations of two or more thereof.

2. The composition of claim 1 wherein the plasticizer includes bis(2-ethylhexyl)phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate, trimethyl trimellitate, tri-(2-ethylhexyl)trimellitate, tri-(n-octyl,n-decyl)trimellitate, tri-(heptyl,nonyl)trimellitate, n-octyl trimellitate, bis(2-ethylhexyl)adipate, dimethyl adipate, monomethyl adipate, dioctyl adipate, bis(capryl lactate)sebacate, dibutyl sebacate, acetyl glycol monolaurate, octyl lactate, 2-ethylhexyl lactate, di(2-ethylhexyl)adipate, diisobutyl adipate, dibutyl adipate, diisodecyl adipate, dibutyldiglycol adipate, di(2-ethylhexyl)adipate, di(2-ethylhexyl)sebacate, methyl acetylricinoleate, butyl acetylricinoleate, acetyltributylcitric acid, diethyl bishydroxymethyl malonate, bis(2-ethyl lactate)adipate, bis(octyl lactate)sebacate, glycol, polyethylene glycol, polyethylene glycol ester, polypropylene glycol, polypropylene glycol ester, diethylene glycol monoacetate, diethylene glycol diacetate, diethylene glycol monopropionate, diethylene glycol dipropionate, diethylene glycol monobutyrate, diethylene glycol dibutyrate, diethylene glycol monovalerate, diethylene glycol divalerate, triethylene glycol monoacetate, triethylene glycol diacetate, triethylene glycol monopropionate, triethylene glycol dipropionate, triethylene glycol monobutyrate, triethylene glycol dibutyrate, triethylene glycol monovalerate, triethylene glycol divalerate, glycerol tripropionate, poly(1,3-butanediol), diglycerol triacetate, glycerol monostearate, dibutyl maleate, diisobutyl maleate, benzoate, N-ethyl toluene sulfonamide, N-(2-hydroxypropyl)benzene sulfonamide, N-(n-butyl)benzene sulfonamide, tricresyl phosphate, tributyl phosphate, triethylene glycol dihexanoate, tetraethylene glycol diheptanoate, or combinations of two or more thereof;

the plasticizer is present in the composition from about 0.01 to about 10%; and the nucleator is present in the composition from about 0.1 to about 4%; each based on the total weight of the composition.

3. The composition of claim 2 wherein the composition comprises the nucleator;

the PHA comprises repeat units derived from hydroxyalkanoic acids having five or fewer carbon atoms;

the plasticizer includes bis(2-ethylhexyl)adipate, dimethyl adipate, monomethyl adipate, dioctyl adipate, bis(capryl lactate) sebacate, dibutyl sebacate, acetyl glycol monolaurate, octyl lactate, 2-ethylhexyl lactate, di(2-ethylhexyl)adipate, diisobutyl adipate, dibutyl adipate, diisodecyl adipate, dibutyldiglycol adipate, di(2-ethylhexyl) adipate, di(2-ethylhexyl)sebacate, methyl acetylricinoleate, butyl acetylricinoleate, acetyltributylcitric acid, diethyl bishydroxymethyl malonate, bis(2-ethyl lactate)adipate, bis(octyl lactate)sebacate, glycol, polyethylene glycol, polyethylene glycol ester, polypropylene glycol, polypropylene glycol ester, diethylene glycol monoacetate, diethylene glycol diacetate, diethylene glycol monopropionate, diethylene glycol dipropionate, diethylene glycol monobutyrate, diethylene glycol dibutyrate, diethylene glycol monovalerate, diethylene glycol divalerate, triethylene glycol monoacetate, triethylene glycol diacetate, triethylene glycol monopropionate, triethylene glycol dipropionate, triethylene glycol monobutyrate, triethylene glycol dibutyrate, triethylene glycol monovalerate, triethylene glycol divalerate, glycerol tripropionate, poly(1,3-butanediol), diglycerol triacetate, glycerol monostearate, or combinations of two or more thereof; and the plasticizer is present in the composition from 0.1 to about 5%; and the nucleator is present in the composition from about 0.5 to about 4%.

4. The composition of claim 3 wherein the PHA comprises repeat units derived from glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof;

the plasticizer includes bis(2-ethylhexyl)adipate, dimethyl adipate, monomethyl adipate, dioctyl adipate, bis(capryl lactate)sebacate, dibutyl sebacate, polyethylene glycol, polyethylene glycol ester, polypropylene glycol, polypropylene glycol ester, or combinations of two or more thereof; and the plasticizer is present in the composition from about 0.5 to about 4; and the nucleator is present in the composition from about 1 to about 4%; each based on the total weight of the composition.

5. The composition of claim 4 wherein the PHA comprises poly(glycolic acid), poly(lactic acid), poly(hydroxy-butyric acid), poly(hydroxy-butyrate-valerate) copolymer, copolymer of glycolic acid and lactic acid, hydroxyvaleric acid, 5-hydroxyvaleric acid, or combinations of two or more thereof;

the nucleator includes aliphatic, mono-functional carboxylic acid; the plasticizer includes bis(2-ethylhexyl)adipate, bis(capryl lactate)sebacate, polyethylene glycol, polyethylene glycol ester, or combinations thereof; and the plasticizer is present in the composition from about 1 to about 3%; and the nucleator is present in the composition from about 0.5 to about 3%; each based on the total weight of the composition.

6. The composition of claim 5 wherein the PHA comprises the poly(lactic acid) and the nucleator includes aliphatic, mono-functional carboxylic acid; the plasticizer is present in the composition from about 0.5 to about 3%; and the nucleator is present in the composition from about 1 to about 2%; each based on the total weight of the composition.

7. The composition of claim 6 wherein the nucleator includes lauric acid, palmitic acid, stearic acid, behenic acid, erucic acid, oleic acid, linoleic acid, behenamide, ethylene bis-stearamide, or combinations of two or more thereof; the plasticizer is present in the composition from about 1 to about 2%; and the nucleator is present in the composition from about 1 to about 2%; each based on the total weight of the composition.

8. The composition of claim 7 wherein the ethylene copolymer is terpolymer of ethylene, butyl acrylate, and glycidyl methacrylate.

9. The composition of claim 7 wherein the nucleator is stearic acid or behenamide.

10. The composition of claim 8 wherein the nucleator is stearic acid or behenamide.

11. The composition of claim 1 further comprising the plasticizer.

12. The composition of claim 11 wherein the ethylene copolymer is terpolymer of ethylene, butyl acrylate, and glycidyl methacrylate.

13. The composition of claim 2 wherein the composition is a concentrated master batch comprising about 25 to about 50% of stearic acid, behenamide, or both and about 50 to about 75% of PHA.

14. An article comprising or produced from a composition wherein the composition is as recited in claim 1.

15. The article of claim 14 wherein
the composition comprises the plasticizer;
the PHA comprises repeat units derived from hydroxyalkanoic acids having five or fewer carbon atoms;
said plasticizer includes bis(2-ethylhexyl)adipate, dimethyl adipate, monomethyl adipate, dioctyl adipate, bis(capryl lactate)sebacate, dibutyl sebacate, acetyl glycol monolaurate, octyl lactate, 2-ethylhexyl lactate, di(2-ethylhexyl)adipate, diisobutyl adipate, dibutyl adipate, diisodecyl adipate, dibutyldiglycol adipate, di(2-ethylhexyl)adipate, di(2-ethylhexyl)sebacate, methyl acetylricinoleate, butyl acetylricinoleate, acetyltributylcitric acid, diethyl bishydroxymethyl malonate, bis(2-ethyl lactate)adipate, bis(octyl lactate)sebacate, glycol, polyethylene glycol, polyethylene glycol ester, polypropylene glycol, polypropylene glycol ester, diethylene glycol monoacetate, diethylene glycol diacetate, diethylene glycol monopropionate, diethylene glycol dipropionate, diethylene glycol monobutyrate, diethylene glycol dibutyrate, diethylene glycol monovalerate, diethylene glycol divalerate, triethylene glycol monoacetate, triethylene glycol diacetate, triethylene glycol monopropionate, triethylene glycol dipropionate, triethylene glycol monobutyrate, triethylene glycol dibutyrate, triethylene glycol monovalerate, triethylene glycol divalerate, glycerol tripropionate, poly(1,3-butanediol), diglycerol triacetate, glycerol monostearate, or combinations of two or more thereof; and
the plasticizer is present in the composition from 0.1 to about 5%; and the nucleator is present in the composition from about 0.5 to about 4%.

16. The article of claim 15 wherein
the PHA comprises poly(glycolic acid), poly(lactic acid), poly(hydroxy-butyric acid), poly(hydroxy-butyrate-valerate) copolymer, copolymer of glycolic acid and lactic acid, hydroxyvaleric acid, 5-hydroxyvaleric acid, or combinations of two or more thereof;
the nucleator includes aliphatic, mono-functional carboxylic acid; the plasticizer includes bis(2-ethylhexyl)adipate, bis(capryl lactate)sebacate, polyethylene glycol, polyethylene glycol ester, or combinations thereof; and
the plasticizer is present in the composition from about 1 to about 3%; and the nucleator is present in the composition from about 0.5 to about 3%; each based on the total weight of the composition.

17. The article of claim 16 wherein the ethylene copolymer is terpolymer of ethylene, butyl acrylate, and glycidyl methacrylate and the nucleator is stearic acid or behenamide.

18. A process comprises contacting a poly(hydroxyalkanoic acid) (PHA) composition or the PHA with a plasticizer and, 0.01 to about 4%, based on the weight of the composition or the PHA, of a nucleator to produce a compound; producing a film or sheet from the compound;
thermoforming the film or sheet in a heated mold at a temperature of from about 50° C. to about 140° C. to produce a thermoformed article; heat setting the article for 1 to about 20 seconds to produce a heat set-article; recovering the heat set-article wherein the plasticizer is as recited in claim 2; and the nucleator includes lauric acid, palmitic acid, stearic acid, behenic acid, erucic acid, oleic acid, linoleic acid, behenamide, or combinations of two or more thereof.

19. The process of claim 18 wherein the PHA comprises poly(lactic acid); the nucleator includes stearic acid, behenic acid, behenamide, ethylene bis-stearamide, or combinations of two or more thereof; the contacting is carried out at a temperature from about 60° C. to about 130° C.; and the heat setting is carried out at about 90° C. to about 135° C. for about 1 to about 20 seconds.

20. The process of claim 19 wherein the plasticizer is bis(2-ethylhexyl)adipate, dimethyl adipate, monomethyl adipate, dioctyl adipate, bis(capryl lactate)sebacate, dibutyl sebacate, polyethylene glycol, polyethylene glycol ester, polypropylene glycol, polypropylene glycol ester, or combinations of two or more thereof; the nucleator is stearic acid or behenamide; the contacting is carried out at a temperature from about 65° C. to about 120° C.; the heat setting is carried out at about 90° C. to about 120° C. for about 1 to about 10 seconds; and the heat set-article is substantially clear.

\* \* \* \* \*